(12) United States Patent
Kim et al.

(10) Patent No.: US 11,025,161 B2
(45) Date of Patent: Jun. 1, 2021

(54) ELECTRIC VEHICLE AND CHARGING APPARATUS THEREOF

(71) Applicants: HYUNDAI MOTOR COMPANY, Seoul (KR); KIA MOTORS CORPORATION, Seoul (KR); Korea Advanced Institute of Science and Technology, Daejeon (KR)

(72) Inventors: JongPil Kim, Yongin-si (KR); Jaehyuk Choi, Seoul (KR); Woo Young Lee, Yongin-si (KR); HanShin Youn, Seoul (KR); Gun-Woo Moon, Daejeon (KR); Jae-Ii Baek, Daejeon (KR); Jung-Kyu Han, Daejeon (KR); Moo-Hyun Park, Daejeon (KR)

(73) Assignees: Hyundai Motor Company, Seoul (KR); KIA Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 139 days.

(21) Appl. No.: 16/170,972

(22) Filed: Oct. 25, 2018

(65) Prior Publication Data
US 2020/0021186 A1    Jan. 16, 2020

(30) Foreign Application Priority Data
Jul. 16, 2018    (KR) .......................... 10-2018-0082533

(51) Int. Cl.
*H02M 1/42*    (2007.01)
*H02M 1/44*    (2007.01)
*B60L 50/51*   (2019.01)
*B60L 53/20*   (2019.01)

(52) U.S. Cl.
CPC ........... *H02M 1/4225* (2013.01); *B60L 50/51* (2019.02); *B60L 53/20* (2019.02); *H02M 1/44* (2013.01)

(58) Field of Classification Search
CPC .................................................. H02M 1/4225
USPC .......................................................... 320/109
See application file for complete search history.

(56) References Cited

U.S. PATENT DOCUMENTS

2013/0057200 A1*  3/2013  Potts ..................... H02J 7/025
                                                          320/107
2019/0326811 A1* 10/2019  Li ........................ H02M 1/4258

FOREIGN PATENT DOCUMENTS

| JP | H05207740 A  | 8/1993  |
| JP | H09504160 A  | 4/1997  |
| KR | 10-0638484 B1 | 11/2006 |
| KR | 10-1420516 B1 | 5/2014  |

* cited by examiner

*Primary Examiner* — Eric D Lee
(74) *Attorney, Agent, or Firm* — Brinks Gilson & Lione

(57) ABSTRACT

Disclosed are an electric vehicle capable of improving the charging efficiency of a charging apparatus by reducing the switching loss that may occur in the charging apparatus of an electric vehicle and a charging apparatus thereof. To this end, a power factor correction apparatus of an on board charger includes a first boost circuit receiving AC power through a first inductor to charge a load, a second boost circuit receiving the AC power through a second inductor to charge the load, and a third inductor provided between a leg of the first boost circuit and a leg of the second boost circuit so that parasitic capacitors of the first boost circuit and the second boost circuit are discharged.

11 Claims, 6 Drawing Sheets

ELECTRIC VEHICLE AND CHARGING APPARATUS THEREOF

CROSS-REFERENCE TO RELATED APPLICATION(S)

The present application claims priority to and the benefit of Korean Patent Application No. 10-2018-0082533, filed on Jul. 16, 2018, which is incorporated by reference herein in its entirety.

TECHNICAL FIELD

The present disclosure relates to a vehicle, and more particularly, to an electric vehicle including an on board charger.

BACKGROUND

The statements in this section merely provide background information related to the present disclosure and may not constitute prior art.

Unlike internal combustion engine vehicles that use fossil fuels as their primary source of energy, electric vehicles use electrical energy as their primary source of energy. Accordingly, electric vehicles require a high-voltage battery capable of storing electric energy, a motor as a power source, and an inverter for driving the motor.

A charger for charging the battery of the electric vehicle may be classified into a slow charger and a rapid charger. The rapid charger converts commercial AC power to DC power and transmits the DC power to a vehicle, while the slow charger transmits commercial AC power to the vehicle in the form of AC power. The slow charger is advantageous in increasing the penetration rate because it is simple in structure and low in price. However, in order to use the slow charger, the electric vehicle must have an on board charger (OBC) installed.

The AC power supplied through the slow charger varies greatly depending on the country where the slow charger is installed. In order to charge the battery of the electric vehicle using the various types of AC power, the on board charger must be able to cope with various types of commercial AC power.

SUMMARY

It is an aspect of the present disclosure to improve the charging efficiency of a charging apparatus by reducing the switching loss that may occur in the charging apparatus of an electric vehicle.

Additional aspects of the present disclosure will be set forth in part in the description which follows and, in part, will be obvious from the description, or may be learned by practice of the disclosure.

In accordance with one aspect of the present disclosure, a power factor correction apparatus includes a first boost circuit receiving AC power through a first inductor to charge a load, a second boost circuit receiving the AC power through a second inductor to charge the load, and a third inductor provided between a leg of the first boost circuit and a leg of the second boost circuit so that parasitic capacitors of the first boost circuit and the second boost circuit are discharged.

The power factor correction apparatus satisfies an electrical characteristic expressed by the following Equation 1, $$½L_A i_{LA}(t_1)^2 - ½L_{B1} i_{LB1}(t_1)^2 > C_{oss} V_O^2 \qquad \text{(Equation 1)}$$

wherein in Equation 1, $L_A$ is a magnitude of the third inductor, $i_{LA}$ is a current of the third inductor, $L_{B1}$ is a magnitude of the first inductor, $i_{LB1}$ is a current of the first inductor, and $C_o$ and $V_0$ are magnitudes of a capacitance and a resistance of an output end of the power factor correction apparatus.

In the power factor correction apparatus, the first boost circuit and the second boost circuit are connected in parallel with each other.

In the power factor correction apparatus, the first boost circuit has a structure in which two switching elements are connected in series and the first inductor is connected between the two switching elements connected in series.

In the power factor correction apparatus, the second boost circuit has a structure in which two switching elements are connected in series and the second inductor is connected between the two switching elements connected in series.

In the power factor correction apparatus, the first inductor is connected between an input AC power source and the first boost circuit, and the second inductor is connected between the input AC power source and the second boost circuit.

In accordance with another aspect of the present disclosure, an on board charger includes a first boost circuit receiving AC power through a first inductor to charge a load, a second boost circuit receiving the AC power through a second inductor to charge the load, a third inductor provided between a leg of the first boost circuit and a leg of the second boost circuit so that parasitic capacitors of the first boost circuit and the second boost circuit are discharged, and a controller configured to control switching operations of the first boost circuit and the second boost circuit.

The on board charger satisfies an electrical characteristic expressed by the following Equation 1, $$½L_A i_{LA}(t_1)^2 - ½L_{B1} i_{LB1}(t_1)^2 > C_{oss} V_O^2 \qquad \text{(Equation 1)}$$

wherein in Equation 1, $L_A$ is a magnitude of the third inductor, $i_{LA}$ is a current of the third inductor, $L_{B1}$ is a magnitude of the first inductor, $i_{LB1}$ is a current of the first inductor, and $C_o$ and $V_0$ are magnitudes of a capacitance and a resistance of an output end of the on board charger.

In the on board charger, the first boost circuit and the second boost circuit are connected in parallel with each other.

In the on board charger, the first boost circuit has a structure in which two switching elements are connected in series and the first inductor is connected between the two switching elements connected in series.

In the on board charger, the second boost circuit has a structure in which two switching elements are connected in series and the second inductor is connected between the two switching elements connected in series.

In the on board charger, the first inductor is connected between an input AC power source and the first boost circuit, and the second inductor is connected between the input AC power source and the second boost circuit.

In accordance with another aspect of the present disclosure, an electric vehicle includes an on board charger including a first boost circuit receiving AC power through a first inductor to charge a load, a second boost circuit receiving the AC power through a second inductor to charge the load, and a third inductor provided between a leg of the first boost circuit and a leg of the second boost circuit so that parasitic capacitors of the first boost circuit and the second boost circuit are discharged; a controller configured to control switching operations of the first boost circuit and the second boost circuit; and a battery configured to be charged by the on board charger.

The electric vehicle satisfies an electrical characteristic expressed by the following Equation 1, $$\tfrac{1}{2}L_A i_{LA}(t_1)^2 - \tfrac{1}{2}L_{B1} i_{LB1}(t_1)^2 > C_{oss} V_O^2 \qquad \text{(Equation 1)}$$

wherein in Equation 1, $L_A$ is a magnitude of the third inductor, $i_{LA}$ is a current of the third inductor, $L_{B1}$ is a magnitude of the first inductor, $i_{LB1}$ is a current of the first inductor, and $C_o$ and $V_0$ are magnitudes of a capacitance and a resistance of an output end of the on board charger.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
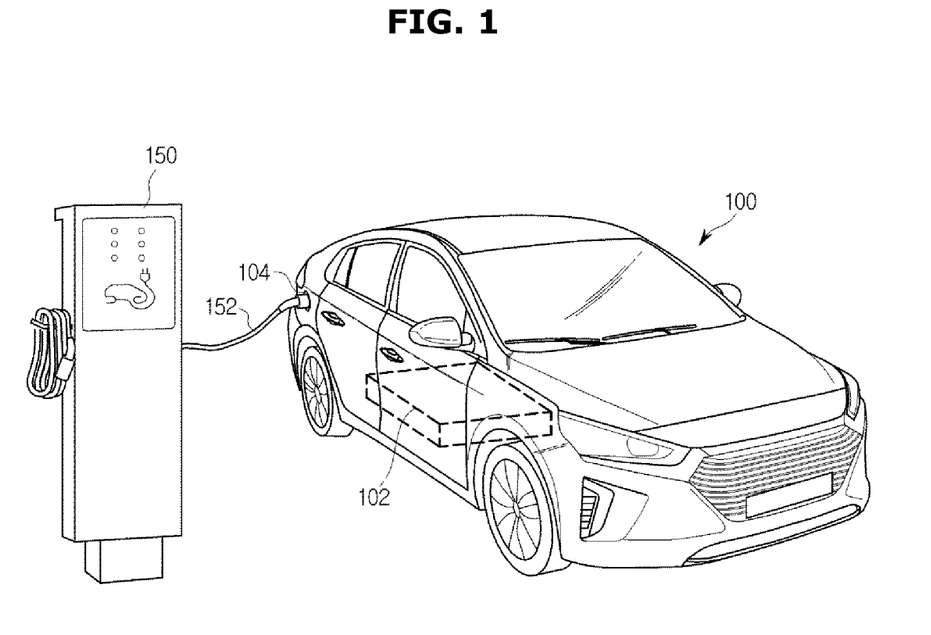
FIG. 1 illustrates an electric vehicle in one form of the present disclosure.

FIG. 1 illustrates an electric vehicle according to an form of the present disclosure.

Figure 2:
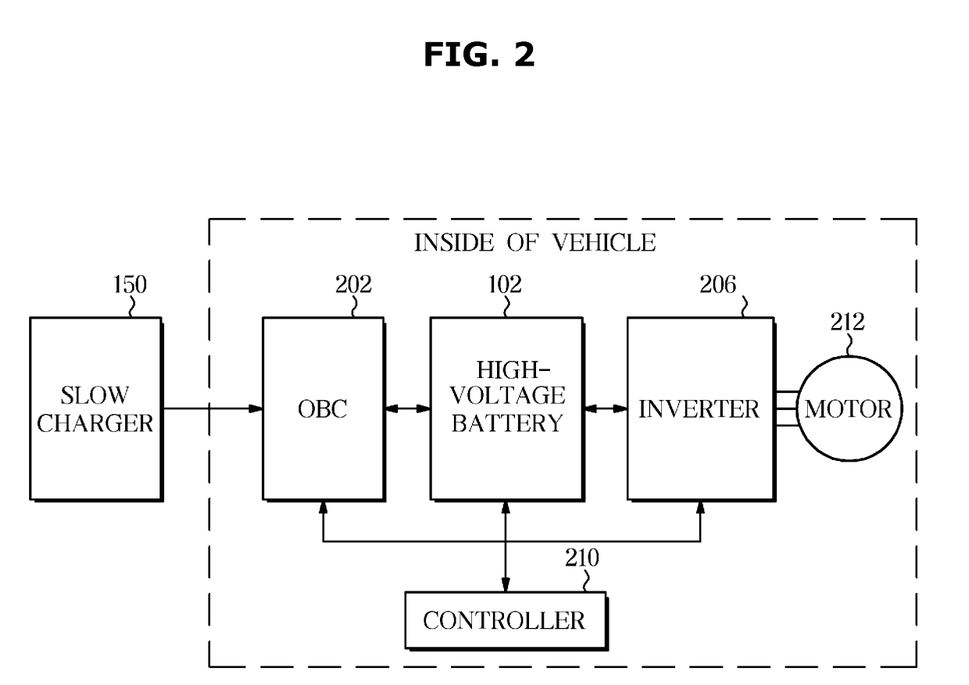
FIG. 2 illustrates a charging system of an electric vehicle in one form of the present disclosure.

An electric vehicle 100 shown in FIG. 1 includes a motor 212 (refer to FIG. 2). Accordingly, a high-voltage battery 102 is required to store power for driving the motor 212. A common internal combustion engine vehicle also has an auxiliary battery (refer to 208 in FIG. 2) on one side of an engine compartment. However, in the case of the electric vehicle 100, the high-voltage battery 102 having a large size and a large capacity is required. In the electric vehicle 100 in some forms of the present disclosure, the high-voltage battery 102 is installed in a lower space of a two-row passenger seat. The power stored in the high-voltage battery 102 may be used to drive the motor 212 to generate power. The high-voltage battery 102 in some forms of the present disclosure may be a lithium battery.

The electric vehicle 100 is provided with a charging socket 104. A charging connector 152 of an external slow charger 150 is connected to the charging socket 104 so that the charging of the high-voltage battery 102 may be performed. That is, when the charging connector 152 of the slow charger 150 is connected to the charging socket 104 of the electric vehicle 100, the high-voltage battery 102 of the electric vehicle 100 is charged.

FIG. 2 illustrates a charging system of an electric vehicle in some forms of the present disclosure.

The slow charger 150 may be used to charge the high-voltage battery 102 of the electric vehicle 100. The high-voltage battery 102 may have a charging voltage between 400V and 800V. The slow charger 150 supplies commercial AC power to the electric vehicle 100 in the form of AC power. The AC power supplied through the slow charger 150 is converted into a DC voltage of a preset level within the electric vehicle 100.

Inside the electric vehicle 100, an on board charger (OBC) 202 is involved in charging the high-voltage battery 102. The on board charger 202, also referred to as OBC, converts the commercial AC power supplied from the slow charger 150 into a DC voltage of 800 V to charge the high-voltage battery 102. The slow charger 150 supplies the commercial AC power to the electric vehicle 100 in the form of AC power. The AC voltage supplied from the slow charger 150 is used to charge the high-voltage battery 102 after being converted into a DC voltage by the on board charger 202 inside the electric vehicle 100.

In FIG. 2, an inverter 206 converts the power of the high-voltage battery 102 to have the electrical characteristics required by the motor 212, and transmits the converted power to the motor 212. The motor 212 generates power by rotating by the power transmitted through the inverter 206.

Figure 3:
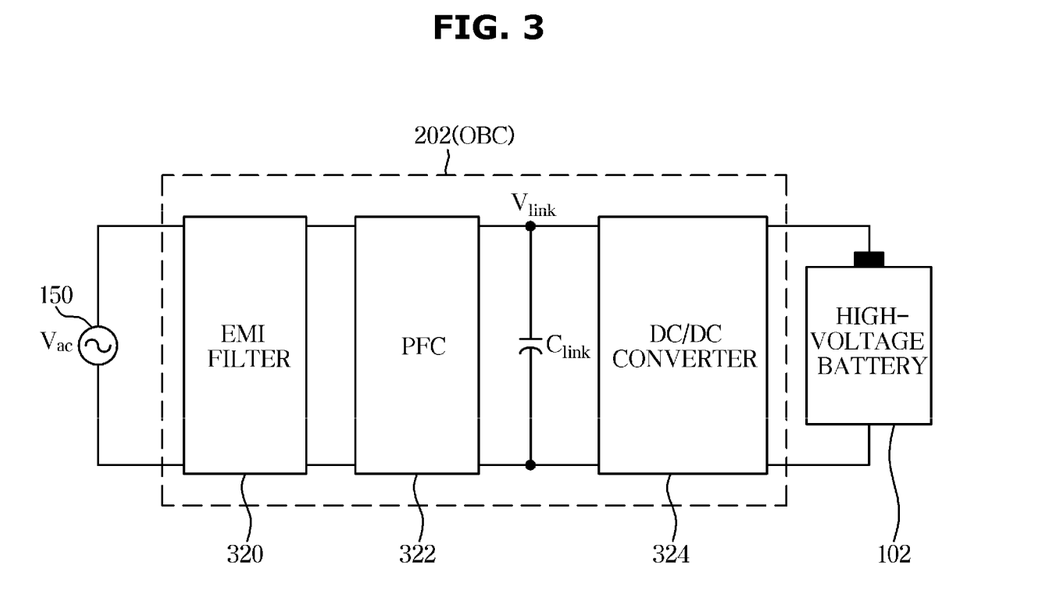
FIG. 3 illustrates an on board charger (OBC) of an electric vehicle in one form of the present disclosure.

FIG. 3 illustrates an on board charger (OBC) of an electric vehicle in some forms of the present disclosure. As shown in FIG. 3, the on board charger 202 of the electric vehicle 100 in some forms of the present disclosure includes an EMI filter 320, a power factor corrector (PFC) 322, and a DC/DC converter 324. The power factor corrector 322 may be a separate independent power factor correction device.

The EMI filter 320 is provided to remove noise contained in the commercial AC power input from the slow charger 150.

The power factor corrector 322, which is an interleaved totem pole boost power factor corrector, will be described in detail with reference to FIG. 4, which will be described later.

The DC/DC converter 324 is connected to the power factor corrector 322 through a link capacitor $C_{link}$. When an output voltage of the power factor corrector 322 charges the link capacitor $C_{link}$, the DC/DC converter 324 converts the charging voltage of the link capacitor $C_{link}$ into a DC voltage of a predetermined level required for charging the high-voltage battery 102 and transmits the DC voltage to the high-voltage battery 102, so that the charging of the high-voltage battery 102 may be performed.

Figure 4:
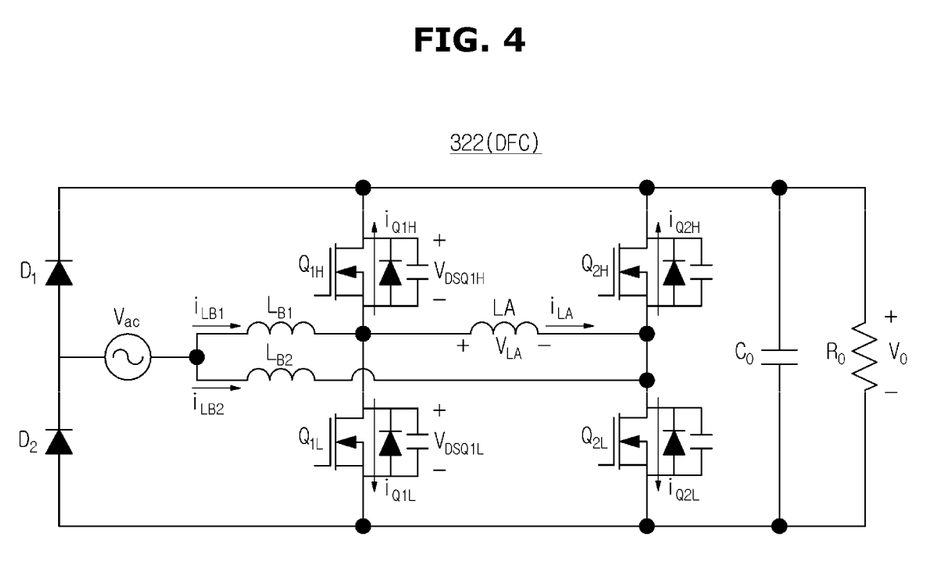
FIG. 4 illustrates a circuit configuration of the on board charger (OBC) shown in FIG. 3.

FIG. 4 illustrates a circuit configuration of the on board charger (OBC) shown in FIG. 3.

As described above with reference to FIG. 3, the power factor corrector 322 is an interleaved boost power factor corrector. That is, as shown in FIG. 4, four switches $Q_{1H}$, $Q_{1L}$, $Q_{2H}$ and $Q_{2L}$, two diodes $D_1$ and $D_2$, and three inductors $L_A$, $L_{B1}$ and $L_{B2}$ constitute an interleaved boost PFC converter. The two switches $Q_{1H}$ and $Q_{1L}$ are connected in series to constitute a single boost circuit, and the other two switches $Q_{2H}$ and $Q_{2L}$ are also connected in series to constitute another single boost circuit. The four switches $Q_{1H}$, $Q_{1L}$, $Q_{2H}$ and $Q_{2L}$ are all composed of elements of the same characteristics, and the two single boost circuits operate with a phase difference of 180 degrees from each other.

The two pairs of switches $Q_{1H}$ and $Q_{1L}$ and switches $Q_{2H}$ and $Q_{2L}$, which are connected in series, are connected in parallel with each other. That is, the two single boost circuits are connected in parallel with each other. One ends of the inductors $L_{B1}$ and $L_{B2}$, which are boost inductors, are connected to a leg of the boost circuit formed by the switches $Q_{1H}$ and $Q_{1L}$ and another leg of the boost circuit formed by the switches $Q_{2H}$ and $Q_{2L}$, respectively. The other ends of the inductors $L_{B1}$ and $L_{B2}$ are connected to the slow charger 150 outside the vehicle, that is, one side of an AC power source $V_{ac}$. The two diodes $D_1$ and $D_2$ are also connected in series. A node between the two diodes $D_1$ and $D_2$ connected in series is connected to the slow charger 150, that is, the other side of the AC power source $V_{ac}$. The inductor $L_A$, which is added in some forms of the present disclosure, is connected between the leg of the boost circuit formed by the switches $Q_{1H}$ and $Q_{1L}$ and the other leg of the boost circuit formed by the switches $Q_{2H}$ and $Q_{2L}$. An output end of the power factor corrector 322 is provided with a capacitor $C_o$ and a resistor $V_o$.

In FIG. 4, currents $i_{LB1}$ and $i_{LB2}$ are the currents flowing in the inductor $L_{B1}$ and the inductor $L_{B2}$, respectively, and current $i_{LA}$ is the current flowing in the inductor $L_A$. Also, currents $i_{Q1L}$ and $i_{Q1L}$ and currents $i_{Q2H}$ and $i_{Q2L}$ are the currents flowing through the switches $Q_{1H}$ and $Q_{1L}$, and the switches $Q_{2H}$ and $Q_{2L}$, respectively. Voltages $V_{DSQ1H}$ and $V_{DSQ1L}$ are the voltages across the parasitic capacitors of the switches $Q_{1H}$ and $Q_{1L}$, respectively. The arrows shown on each of the four switches $Q_{1H}$, $Q_{1L}$, $Q_{2H}$ and $Q_{2L}$ indicate the direction of the current.

Figure 5:
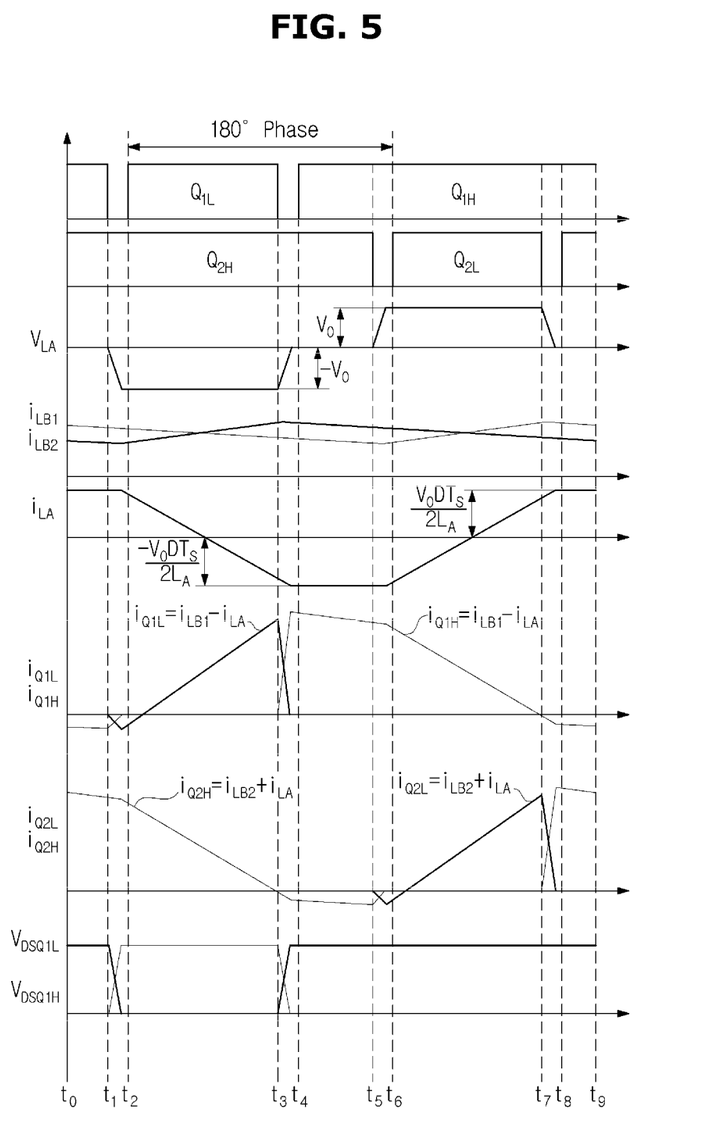
FIG. 5 is a graph illustrating operating characteristics of a power factor corrector in one form of the present disclosure.
Figure 6:
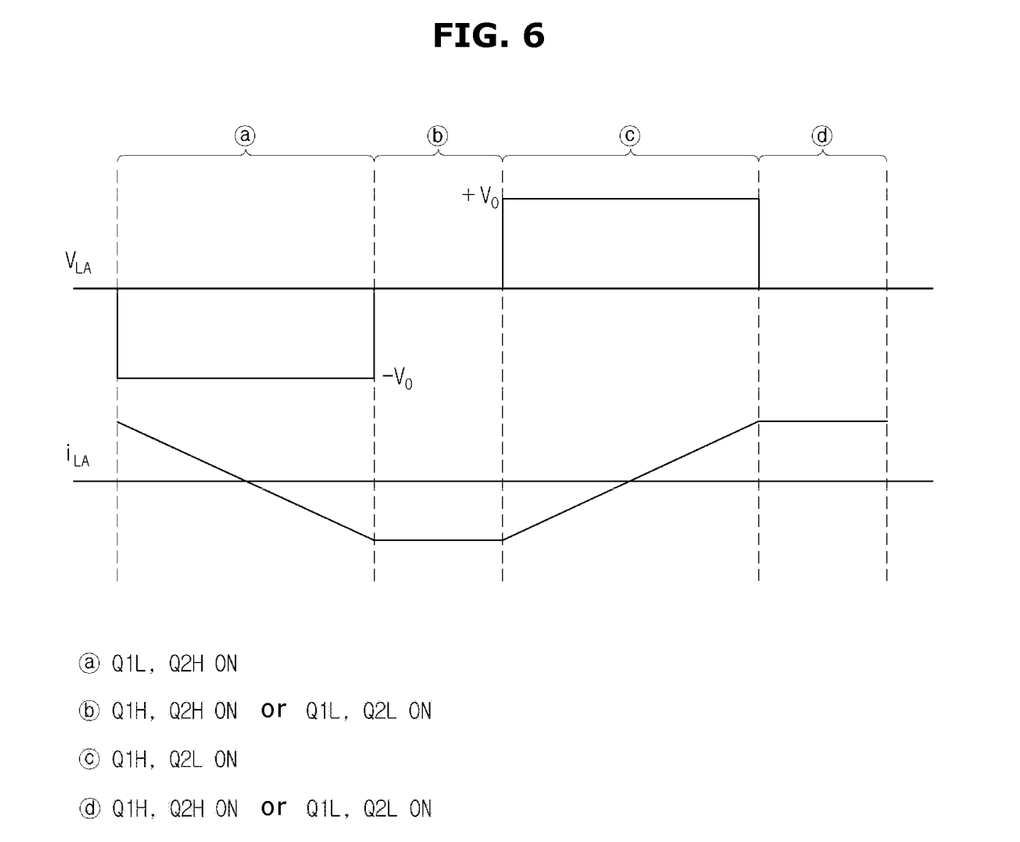
FIG. 6 is a graph illustrating voltage and current waveforms of an inductor separately in the graph shown in FIG. 5.

FIG. 5 is a graph illustrating operating characteristics of a power factor corrector in some forms of the present disclosure, and FIG. 6 is a graph illustrating voltage and current waveforms of an inductor separately in the graph shown in FIG. 5. FIG. 5 shows the overall operation characteristics of the power factor corrector 322 in some forms of the present disclosure. FIG. 6 shows the switches that are turned on in each section where the voltage $V_{LA}$ and the current $i_{LA}$ of the inductor $L_A$ change.

As described above with reference to FIG. 4, the three inductors $L_A$, $L_{B1}$, and $L_{B2}$ are provided in the power factor corrector 322 of the on board charger 202 in some forms of the present disclosure. Among the three inductors, the inductor $L_A$ is intended to reduce the switching loss caused by the hard switching of the switches $Q_{1H}$, $Q_{1L}$, $Q_{2H}$, and $Q_{2L}$. That is, zero voltage switching is possible during the switching of the switches $Q_{1H}$, $Q_{1L}$, $Q_{2H}$, and $Q_{2L}$ by discharging all of the voltages of the respective parasitic capacitors of the switches $Q_{1H}$, $Q_{1L}$, $Q_{2H}$, and $Q_{2L}$, thereby reducing the switching loss.

Prior to the description of FIG. 5, referring to FIG. 6, when the power factor corrector 322 operates, two of the four switches $Q_{1H}$, $Q_{1L}$, $Q_{2H}$, and $Q_{2L}$ are turned off and the other two are turned on. For example, the switches turned on in each of four sections $t_1$, $t_2$, $t_3$, and $t_4$ shown in FIG. 6 are as follows. The other two switches are turned off except for the two switches that are turned on.

(a) $Q_{1L}$ and $Q_{2H}$: ON
   (b) $Q_{1H}$ and $Q_{2H}$: ON or $Q_{1L}$ and $Q_{2L}$: ON
   (c) $Q_{1H}$ and $Q_{2L}$: ON
   (d) $Q_{1H}$ and $Q_{2H}$: ON or $Q_{1L}$ and $Q_{2L}$: ON As shown in FIG. 5, the magnitude of the voltage applied to the inductor $L_A$ varies depending on the switches turned on. In addition, the current flowing in the inductor $L_A$ repeats increasing and decreasing around zero. The difference or sum of the current flowing in the inductor $L_A$ and the currents flowing in the remaining inductors $L_{B1}$ and $L_{B2}$ flows to the switches which are turned on. Since the two switches $Q_{1L}$ and $Q_{2L}$ perform a build-up operation when a positive (+) input voltage is applied, the two switches $Q_{1L}$ and $Q_{2L}$ must perform zero voltage switching. A reverse current flows before the two switches $Q_{1L}$ and $Q_{2L}$ are turned on and the voltage charged in the parasitic capacitors of the two switches $Q_{1L}$ and $Q_{2L}$ is completely discharged by the inductor $L_A$.

Accordingly, the power factor corrector 322 in some forms of the present disclosure reduces the switching loss that may occur in the high frequency switching operation by the action of the inductor $L_A$, so that the heat load of the power factor corrector 322 may be reduced. Also, by reducing the switching loss, which is the most important loss, the power factor corrector 322 has higher efficiency than the conventional power factor corrector. Furthermore, it is also a great advantage that the present disclosure may be implemented by the addition of the inductor $L_A$ without the addition of an active element or a driving circuit or change of a structure.

As shown in FIGS. 5 and 6, since the structure and operation of the power factor corrector 322 are symmetric, the description of either the case where a positive (+) AC input voltage is input or the case where a negative (−) AC input voltage is input may be applied similarly (symmetrically) to the description of the other case. That is, assuming that a positive (+) AC input voltage is applied, no current flows through the diode $D_1$, and only current flows through the diode $D_2$. The currents $i_{LB1}$ and $i_{LB2}$ flowing in the inductors $L_{B1}$ and $L_{B2}$, which are the boost inductors, increase with the slopes of $V_{ac}/L_B$ when the switches $Q_{1L}$ and $Q_{2L}$ are turned on, respectively, and decrease with $(V_{ac}-V_0)/L_B$ when the switches $Q_{1H}$ and $Q_{2H}$ are turned on, respectively. The inductor $L_A$ is supplied with voltages Vo, 0, and −Vo depending on the switches turned on (refer to FIG. 6), and the current $i_{LA}$ flowing in the inductor $L_A$ repeats $-VoDT/2L_A$ and $voDT/2L_A$ when a switching period T and a duty ratio D are satisfied.

The current flowing through the switch $Q_{1L}$ and the switch $Q_{1H}$ is $i_{LB1}-i_{LA}$, and the current flowing through the switch $Q_{2L}$ and the switch $Q_{2H}$ is $i_{LB1}+i_{LA}$. Since the current flowing through each switch before the switches $Q_{1L}$ and $Q_{2L}$ are turned on has a negative (−) value and flows through the body diode of each switch, zero voltage switching is achieved. Further, the current flowing through the switch $Q_{1H}$ and the switch $Q_{2H}$ may reduce the reverse recovery of the body diodes of the corresponding switches because the corresponding switches are turned off by the zero current switching.

In order to implement zero voltage switching of the power factor corrector 322, all the output capacitors must be discharged before each switch of the power factor corrector 322 is turned on. Since the discharge is performed using the energy of the inductor $L_A$, the electric characteristics of the power factor corrector 322 must be a condition satisfying the following Equation 1.

$$\tfrac{1}{2}L_A i_{LA}(t_1)^2 - \tfrac{1}{2}L_B i_{LB1}(t_1)^2 > C_{oss} V_O^2 \quad \text{(Equation 1)}$$

In Equation 1, $L_A$ is a magnitude of the inductor $L_A$, $i_{LA}$ is a current of the inductor $L_A$, $L_{B1}$ is a magnitude of the inductor $L_{B1}$, $i_{LB1}$ is a current of the inductor $L_{B1}$, and $C_o$ and $V_0$ are magnitudes of a capacitance and a resistance of an output end of the power factor corrector 322.

Accordingly, zero voltage switching may be easily implemented in a section where the current $i_{LB1}$ is small, but zero voltage switching may not be implemented in a section where the current $i_{LB1}$ is large. If the value of the inductor $L_A$ is decreased, the current $i_{LA}$ is increased to implement zero voltage switching in a wider section, thereby reducing the switching loss. However, in this case, RMS current may increase so that the conduction loss may increase. Therefore, it is preferable to select the value of the inductor $L_A$ as a value at which the maximum efficiency may be obtained through loss analysis.

As is apparent from the above, the present disclosure can improve the charging efficiency of a charging apparatus by reducing the switching loss that may occur in the charging apparatus of an electric vehicle.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A power factor correction apparatus comprising:
   a first boost circuit configured to receive AC power through a first inductor to charge a load;
   a second boost circuit configured to receive the AC power through a second inductor to charge the load; and
   a third inductor provided between a leg of the first boost circuit and a leg of the second boost circuit such that parasitic capacitors of the first boost circuit and the second boost circuit are discharged,
   wherein the third inductor has a magnitude to implement zero voltage switching of the first boost circuit and the second boost circuit when the parasitic capacitors are discharged, and
   wherein the apparatus comprises an electrical characteristic calculated based on the equation:

$$½L_A i_{LA}(t_1)^2 - ½L_{B1} i_{LB1}(t_1)^2 > C_{oss} V_O^2,$$

wherein $L_A$ is a magnitude of the third inductor, $i_{LA}(t1)$ is a current of the third inductor at time t1, $L_{B1}$ is a magnitude of the first inductor, $i_{LB1}(t1)$ is a current of the first inductor at the time t1, $C_{oss}$ is a magnitude of a capacitance of an output end of the power factor correction apparatus, and $V_O$ is a magnitude of a resistance of the output end of the power factor correction apparatus.

2. The power factor correction apparatus of claim 1, wherein the first boost circuit and the second boost circuit are connected in parallel with each other.

3. The power factor correction apparatus of claim 1, wherein the first boost circuit has a structure that two switching elements are connected in series and the first inductor is connected between the two switching elements.

4. The power factor correction apparatus of claim 1, wherein the second boost circuit has a structure that the two switching elements are connected in series and the second inductor is connected between the two switching elements.

5. The power factor correction apparatus of claim 1, wherein the first inductor is connected between an input AC power source and the first boost circuit; and
   the second inductor is connected between the input AC power source and the second boost circuit.

6. An on board charger comprising:
   a first boost circuit configured to receive AC power through a first inductor to charge a load;
   a second boost circuit configured to receive the AC power through a second inductor to charge the load;
   a third inductor provided between a leg of the first boost circuit and a leg of the second boost circuit such that parasitic capacitors of the first boost circuit and the second boost circuit are discharged; and
   a controller configured to control switching operations of the first boost circuit and the second boost circuit,
   wherein the third inductor has a magnitude to implement zero voltage switching of the first boost circuit and the second boost circuit when the parasitic capacitors are discharged,
   wherein the on board charger comprises an electrical characteristic calculated based on the equation:

$$½L_A i_{LA}(t_1)^2 - ½L_{B1} i_{LB1}(t_1)^2 > C_{oss} V_O^2,$$

wherein $L_A$ is a magnitude of the third inductor, $i_{LA}(t1)$ is a current of the third inductor, $L_{B1}$ is a magnitude of the first inductor, $i_{LB1}(t1)$ is a current of the first inductor at the time t1, $C_{oss}$ is a magnitude of a capacitance of an output end of the on board charger, and $V_O$ is a magnitude of a resistance of the output end of the on board charger.

7. The on board charger of claim 6, wherein the first boost circuit and the second boost circuit are connected in parallel with each other.

8. The on board charger of claim 6, wherein the first boost circuit has a structure that two switching elements are connected in series and the first inductor is connected between the two switching elements.

9. The on board charger of claim 6, wherein the second boost circuit has a structure that the two switching elements are connected in series and the second inductor is connected between the two switching elements.

10. The on board charger of claim 6, wherein the first inductor is connected between an input AC power source and the first boost circuit; and
    the second inductor is connected between the input AC power source and the second boost circuit.

11. An electric vehicle comprising:
    an on board charger comprising:
      a first boost circuit configured to receive AC power through a first inductor to charge a load;
      a second boost circuit configured to receive the AC power through a second inductor to charge the load; and
      a third inductor provided between a leg of the first boost circuit and a leg of the second boost circuit such that parasitic capacitors of the first boost circuit and the second boost circuit are discharged;
    a controller configured to control switching operations of the first boost circuit and the second boost circuit; and
    a battery configured to be charged by the on board charger,
    wherein the third inductor has a magnitude to implement zero voltage switching of the first boost circuit and the second boost circuit when the parasitic capacitors are discharged,
    wherein the electric vehicle comprises an electrical characteristic calculated based on the equation:

$$½L_A i_{LA}(t_1)^2 - ½L_{B1} i_{LB1}(t_1)^2 > C_{oss} V_O^2,$$

wherein $L_A$ is a magnitude of the third inductor, $i_{LA}(t1)$ is a current of the third inductor, $L_{B1}$ is a magnitude of the first inductor, $i_{LB1}(t1)$ is a current of the first inductor at the time t1, $C_{oss}$ is a magnitude of an output end of the on board charger, and $V_O$ is a magnitude of a resistance of the output end of the on board charger.

\* \* \* \* \*